UNITED STATES PATENT OFFICE.

WILLIAM F. SPECK, OF EVANSVILLE, INDIANA.

PROCESS OF MANUFACTURING CANDY AND CANDY PRODUCED THEREBY.

1,025,326.  Specification of Letters Patent.  Patented May 7, 1912.

No Drawing.  Application filed June 6, 1910.  Serial No. 565,283.

*To all whom it may concern:*

Be it known that I, WILLIAM F. SPECK, a citizen of the United States, residing at Evansville, county of Vanderburg, and State of Indiana, have invented a certain new and useful Process of Manufacturing Candy and Candy Produced Thereby, of which the following is a specification.

This invention relates to processes for the manufacture of candy and candy produced thereby.

My object is to provide a candy which will be nutritious, very palatable, and inexpensive of production by a new process which may be readily carried out.

In producing my new candy, ordinary corn is cracked or broken by any approved machine until it is of the size of ordinary hominy. The cracked or broken corn is then steamed or heated in any approved manner to an extent and degree sufficient to soften the hulls so that they will be properly absorptive but without softening the heart of the corn. The softened corn is then treated with any suitable sweetening mixture or syrup such as melted sugar, molasses, or other desirable ingredient, and owing to cracking and steaming, the corn partially absorbs the sweetening. The sweetened broken corn is next rolled into flakes of any desired thickness. After rolling into flakes, the particles, while still warm and sticky are mixed with a composition of sweets and finely ground or powdered nuts of any kind, peanuts being an instance. The powdered or ground composition adheres to both sides of the flakes by reason of the stickiness thereof due to the presence of sweetening or syrup. If desired the confection may then be given a second rolling so that the nuts and additional sweetening are mechanically worked into the flakes, after which the flakes are toasted. If the second rolling is resorted to the flakes will not form into sheets for the reason that after the nut powder adheres to the syrup the outside of the nut powder is not sticky.

The finished product, while of the flaky consistency of certain breakfast foods now on the market, is of a different color and flavor, being extremely palatable and very sweet, beside possessed of the nutritive properties of the sugar, nuts and corn.

Having thus described my invention, what I claim as new and desire to secure by Letters Patent, is:—

1. A confection consisting of flaked corn coated with powdered nuts and a sweetening agent.

2. As a process of manufacturing candy, heating cracked or broken corn, then adding a sweetening agent which is allowed to become partially absorbed by the cracked corn, adding powdered nuts, and forming it into flakes.

3. The process of manufacturing candy consisting of heating cracked or broken corn, then adding a sweetening agent, rolling into flakes, adding a sweetening agent and powdered nuts, and, finally, rolling it into flakes.

In testimony whereof, I hereunto affix my signature in presence of two witnesses.

WILLIAM F. SPECK.

Witnesses:
CHESTER O. SCHMIDT,
ROSA HEEGER.